(12) United States Patent
Chiquoine et al.

(10) Patent No.: US 6,950,966 B2
(45) Date of Patent: Sep. 27, 2005

(54) DATA TRANSMISSION FROM RAID SERVICES

(75) Inventors: Kenneth F. Chiquoine, Sharon, NH (US); Bruce Mann, Mason, NH (US); Michael D. Raspuzzi, Leominster, MA (US); Philip J. Trasatti, Brookline, NH (US)

(73) Assignee: SeaChange International, Inc., Maynard, MA (US)

( * ) Notice: Subject to any disclaimer, the term of this patent is extended or adjusted under 35 U.S.C. 154(b) by 415 days.

(21) Appl. No.: 09/907,534

(22) Filed: Jul. 17, 2001

(65) Prior Publication Data

US 2003/0016596 A1 Jan. 23, 2003

(51) Int. Cl.[7] .............................................. G06F 11/00
(52) U.S. Cl. ............................................ 714/42; 714/8
(58) Field of Search .................... 714/6, 8, 42; 711/137, 711/114

(56) References Cited

U.S. PATENT DOCUMENTS

| | | | |
|---|---|---|---|
| 5,862,312 A | 1/1999 | Mann et al. | |
| 5,996,089 A | 11/1999 | Mann et al. | |
| 6,185,368 B1 | 2/2001 | Iwasaki et al. | |
| 6,212,657 B1 * | 4/2001 | Wang et al. | 714/746 |
| 6,301,711 B1 * | 10/2001 | Nusbickel | 725/93 |
| 6,327,672 B1 * | 12/2001 | Wilner | 714/6 |
| 6,397,348 B1 * | 5/2002 | Styczinski | 714/6 |
| 6,404,975 B1 * | 6/2002 | Bopardikar et al. | 386/46 |
| 6,449,730 B2 | 9/2002 | Mann et al. | |
| 6,530,035 B1 * | 3/2003 | Bridge | 714/6 |
| 6,557,114 B2 | 4/2003 | Mann et al. | |
| 6,567,926 B2 | 5/2003 | Mann et al. | |
| 6,571,349 B1 | 5/2003 | Mann et al. | |
| 6,574,745 B2 | 6/2003 | Mann et al. | |
| 6,631,477 B1 * | 10/2003 | LeCrone et al. | 714/5 |
| 6,633,955 B1 * | 10/2003 | Yin et al. | 711/114 |
| 6,647,516 B1 * | 11/2003 | Rust et al. | 714/48 |
| 6,651,137 B2 * | 11/2003 | Baek et al. | 711/114 |
| 6,701,413 B2 * | 3/2004 | Shirai et al. | 711/137 |
| 2001/0056520 A1 * | 12/2001 | McBryde et al. | 711/114 |
| 2002/0066050 A1 * | 5/2002 | Lerman et al. | 714/6 |
| 2002/0104037 A1 * | 8/2002 | McAfee | 714/6 |
| 2003/0005354 A1 * | 1/2003 | Kalman | 714/7 |

FOREIGN PATENT DOCUMENTS

| | | |
|---|---|---|
| EP | 0 657 801 A1 | 6/1995 |
| GB | 2 270 791 A | 3/1994 |
| GB | 2 357 171 A | 6/2001 |
| WO | WO 99/34291 A | 7/1999 |
| WO | WO 00/52802 A | 9/2000 |

OTHER PUBLICATIONS

Buddhikot et al., "Design of a large scale multimedia storage server", XP–002093312, Computer Networks and ISDN Systems.

Cao, et al., "The TickerTAIP parallel RAID architecture", HP Laboratories Technical Report (1992).

Chen, et al., "RAID: High Performance, Reliable Secondary Storage", ACM Computing Surveys.

(Continued)

*Primary Examiner*—Scott Baderman
*Assistant Examiner*—Anne L. Damiano
(74) *Attorney, Agent, or Firm*—Fish & Richardson P.C.

(57) ABSTRACT

A redundant array includes a plurality of disks, a bus coupling the disks, a receiving device, and a device to reconstruct a block stored in one of the disks. The device reconstructs the block with associated data and parity blocks from other disks. The device transmits the reconstructed block to the receiving device in response to the one of the disks being unavailable or degraded.

30 Claims, 6 Drawing Sheets-

OTHER PUBLICATIONS

Ghandeharizadeh et al., "Striping in Multi–disk Video Servers", Proceedings of the SPIE High–Density Data Recording and Retrieval Technologies Conference (Oct. 1995).

Long et al., "Swift/RAID: a Distributed RAID System", XP–0021563030.

Stonebraker et al., "Distributed RAID—A New Multiple Copy Algorithm", IEEE (1990).

Tierney et al., "Distributed Parallel Data Storage Systems: A Scalable Approach to High Speed Image Servers", Imaging and Distributed Computing Group and Data Management Research Group, Lawrence Berkeley Laboratory, Berkeley, CA.

Wilkes, J., "DataMesh—scope and objectives: a commentary", Hewlett Packard (Jul. 19, 1989).

* cited by examiner

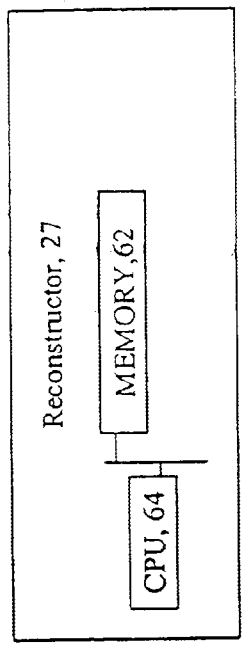
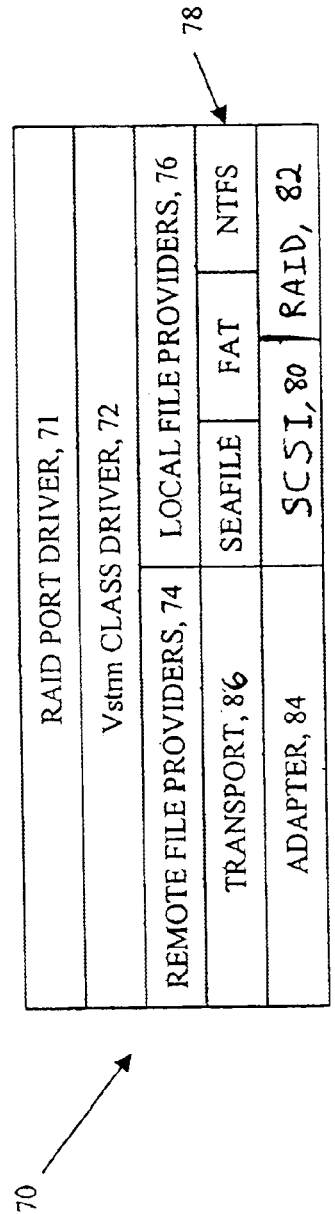

DATA TRANSMISSION FROM RAID SERVICES

BACKGROUND

This invention relates generally to the transmission and storage of data on RAID devices and clustered computer systems.

Digital video and television systems need high bandwidth data transmission and low latencies. Redundant arrays of inexpensive disks (RAID) support high bandwidth data transfers and very low latencies. RAID storage uses redundancy and/or parity blocks to mask the failure of a disk. RAID arrays have limited capacity to handle failures due to fixed reconstruction cache size.

RAID storage divides a received data stream into a sequence of blocks and write consecutive blocks of the sequence to different disks in the array. To retrieve data, the blocks are read from the disks of the array and are reconstituted into the original data stream from the read blocks. To increase reception and transmission speeds, the various disks of the array of the RAID storage may be written to and read from in parallel.

Individual disks of a RAID storage configuration will occasionally stall or respond slowly to an access request due to disk surface defects and bad block re-vectoring. Another problem occurs when a drive is being rebuilt or reconstructed from information on other drives. During a slow response, the entire RAID configuration may wait while one disk transmits requested data. Thus, a single slowly responding disk can cause a long latency for a read operation from the RAID configuration.

For digital video and cable systems, one slowly responding disk can cause a disaster, because data needs to arrive at a video receiver at a substantially constant rate to keep the receiver's input buffer full. Continued long transmission latencies can deplete the input buffer. If a slow RAID configuration causes a transmission gap so that the receiver's input buffer empties a viewer may perceive a noticeable pause in the video being viewed. Defect-free transmission of video requires that such pauses be absent.

SUMMARY

According to an aspect of the invention, a method for reading data from a clustered system of a plurality of redundant array of inexpensive disks (RAID) device configurations includes receiving a message from a requesting one of members of the clustered system that indicates a next location for a particular block for a subsequent read operation from a drive in the RAID device and returning to the requesting one of members of the clustered system a hint that indicates the state of the drive in the RAID device corresponding to location for the subsequent read operation.

According to an additional aspect of the invention, a clustered system of a plurality of redundant array of inexpensive disks (RAID) configurations to transmit data blocks to a receiving device includes a plurality of cluster members coupled so that any one cluster member can deliver data to at least some of remaining cluster members. Each cluster member includes a plurality of disks adapted to store the blocks and to transmit the stored blocks to the receiving device and a processor to control reads from and writes to the plurality of disks. The member also includes a process to receive a message that indicates a next location for a particular block for a subsequent read operation from a drive in the RAID device and produce a hint that indicates the state of the drive in the RAID device corresponding to location for the subsequent read operation.

According to an additional aspect of the invention, a clustered configuration includes a plurality of clustered nodes each node comprising a redundant array of inexpensive disks (RAID) and a processor adapted to write blocks to and read blocks from the arrays and a process to receive a message that indicates a next location for a particular block for a subsequent read operation from a drive in the redundant arrays of inexpensive disks of one of the nodes and produce a hint that indicates the state of the drive in the redundant arrays of inexpensive disks corresponding to location for the subsequent read operation.

One or more of the following advantages may be provided by one or more aspects of the present invention.

A clustered system includes a plurality of cluster members. When the clustered system requests data from a RAID configuration of one of the cluster members, a message is return that indicates the state of the member on the next read for a particular block. This message or hint can indicate that reading a particular block will be slow or that the device is degraded or unavailable. When the system reads the particular block, the system will skip the bad drive and instead read the parity and data block from the other drives. A reconstructor performs an XOR operation on parity and data to reconstruct the missing data corresponding to the bad or reconstructing drive. Thus, by skipping the bad drive and not waiting for a slow or degraded node or drive to respond before trying to reconstruct data improves the performance of the RAID array while in degraded state such that performance of the RAID array approaches or reaches normal performance.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a block diagram of a reconstructor of data blocks for use in the RAID configuration of FIG. 1.

FIG. 6 is a diagram that depicts software layers of a processor used in the RAID configuration of FIG. 1.

DETAILED DESCRIPTION

Figure 1:
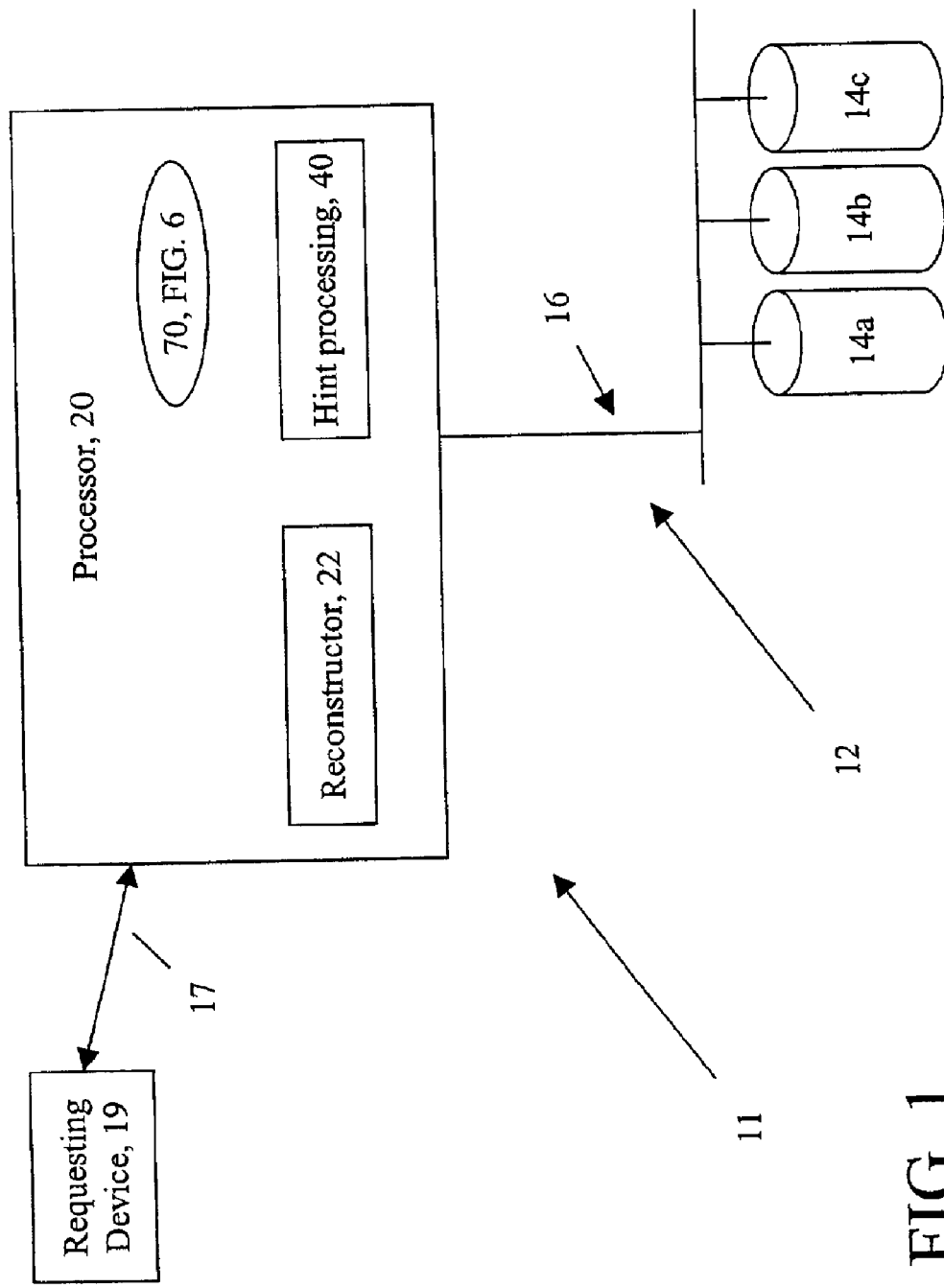
FIG. 1 is a block diagram of a configuration for a redundant array of inexpensive disks (RAID).

Referring to FIG. 1, a computer node 11 includes RAID configuration 12 and a processor 20. The RAID configuration 12 is under control of the processor 20 and includes three storage disks 14a, 14b and 14c and individual disk controllers (not shown). The RAID configuration 12 also includes a bus 16 for transmitting data writes to and reads of the three disks 14a, 14b and 14c under control of processor 20. Generally, such configurations 12 may have N disks where N is 3 or greater. In some embodiments two disk drives can be used if mirroring is allowed. The writes and reads are of data and/or parity blocks. The processor 20 includes a reconstructor 22 to reconstruct data blocks from failed disks 14a, 14b and 14c. The bus 16 can have separate data and control lines (not shown) for each of the disks 14a, 14b and 14c. The reads and writes may be parallel accesses to all or to a subset of the disks 14a, 14b and 14c. In other embodiments a single set of data and control lines connects to each disk 14a, 14b and 14c of the RAID configuration 12, and the processor 20 performs serial writes to and reads from the separate disks 14a, 14b and 14c over the shared data line. In this case, the bus 16 may be a single SCSI bus or another type of shared or dedicated interconnect.

The processor 20 also includes a reconstructor 22. In some embodiments, the processor 20 is programmed to provide the reconstructor 22. In other embodiments, the reconstructor 22 is implemented as a coprocessor, as discussed below.

The processor 20 transmits data blocks over an interface or line 17, for example, a bus or a cable, airwaves, and so forth to a requesting device 19. The processor 20 executes a process 40 to produce a hint for use by the processor 20 or in some embodiments, a remote receiving device (e.g., receiving device 19) to indicate that a request for data may be directed to a disk that is bad or will have a slow response. The file system (described below) executes on processor 20 has knowledge of how data is stored on disk drives. The file system has a mapping of data blocks to disk storage locations. The disk controller (not shown) returns a message to the file system indicating the state of the disk drives. With the knowledge of the mapping and message pertaining to the state of the disk drives, the file system can produce the hint to the processor 20 or a requesting system 19, as the case may be. The processor 20 or requesting system 19 determines whether to read the block from the drive or initiate a recovery mode and read the corresponding parity block and data from other drives, thus avoiding the bad drive. Software components 70 including the file system are described in FIG. 6.

Figure 2:
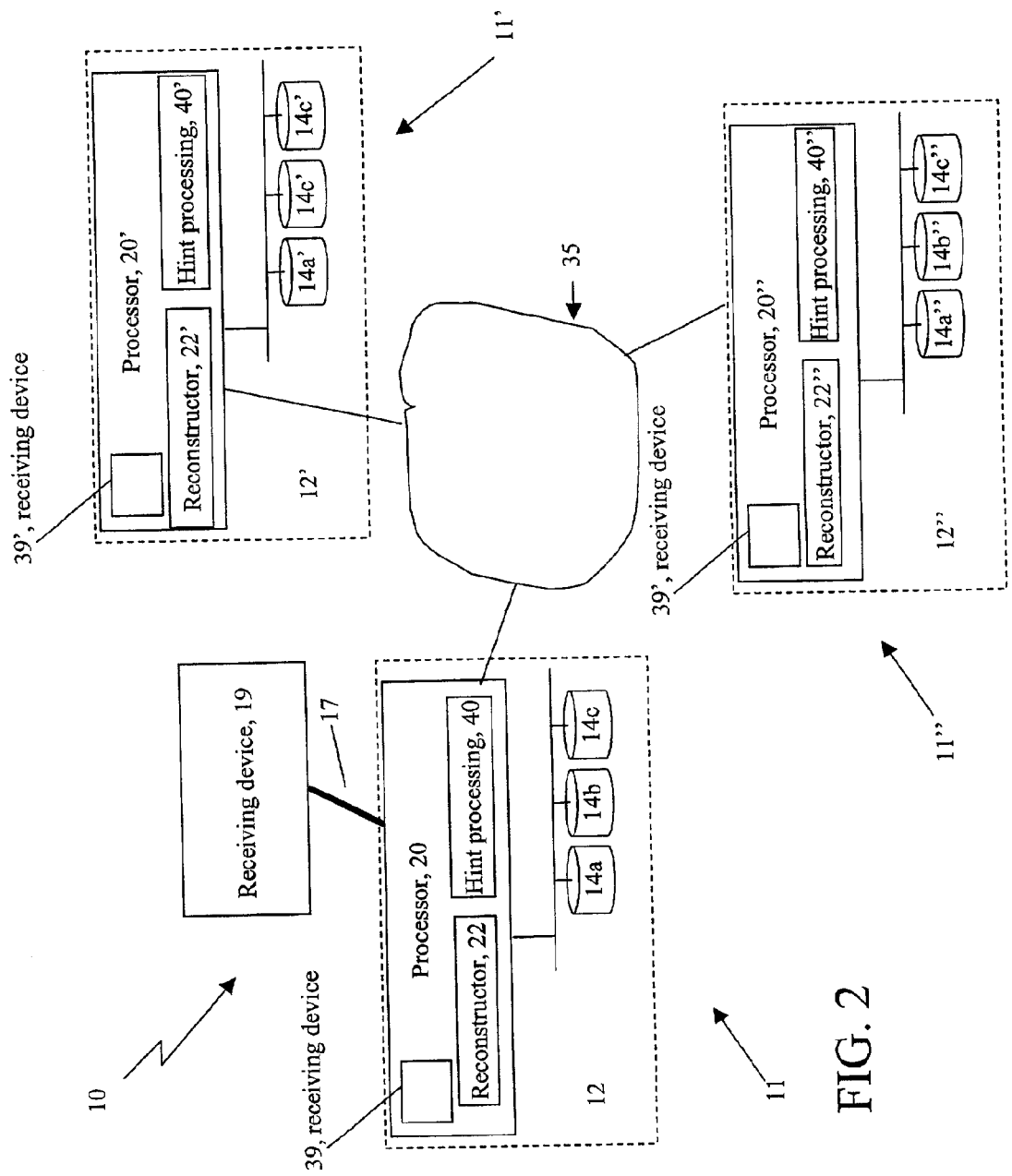
FIG. 2 is a block diagram of a clustered computer system employing three redundant array of inexpensive disks (RAID) configurations shown in FIG. 1.

Referring to FIG. 2, a clustered system 10 includes a plurality of nodes 11, 11', 11" including respective RAID configurations 12, 12', 12" as in FIG. 1. The clustered system 10 is an architecture that stores data (e.g., for a video on demand embodiment, MPEG video and audio) across a set of loosely coupled computer systems 11. Each of the nodes 11, 11' and 11" include respectively ones of the RAID configurations 12, 12' and 12", and local and remote file systems (discussed below) so that any one of the nodes can access data on any and/or all of the other nodes 12–12" in the clustered system 10. The nodes 11, 11', 11" are interconnected by a network 35 so that any one of the cluster members can communicate directly with some or all of the other members of the cluster 10. Exemplary networks include a point-to-point, or switched, packet, or cell networks, bus configurations, hyper-cube arrangements and so forth. In some embodiments, the disk drives themselves need not be a redundant RAID configuration or a RAID configuration. Exemplary redundant RAID configurations include RAID-5 and RAID-4.

Figure 3:
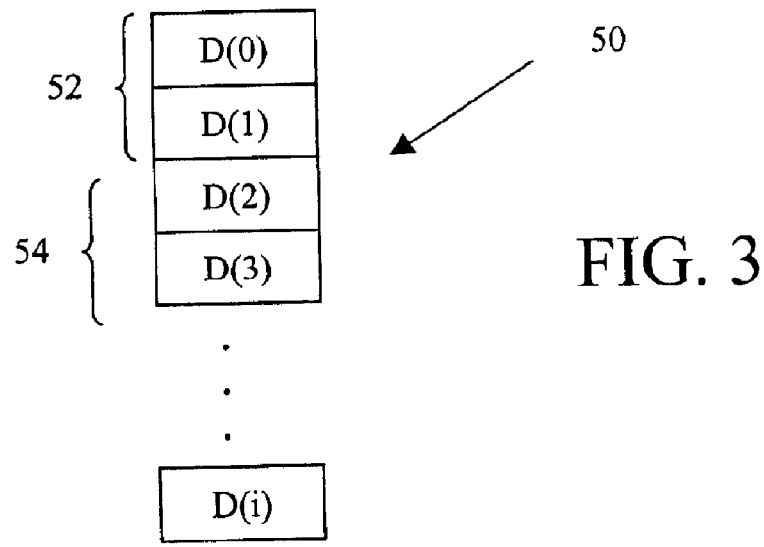
FIG. 3 shows a fragment of a data stream sent to the RAID configuration of FIG. 1.
Figure 4:
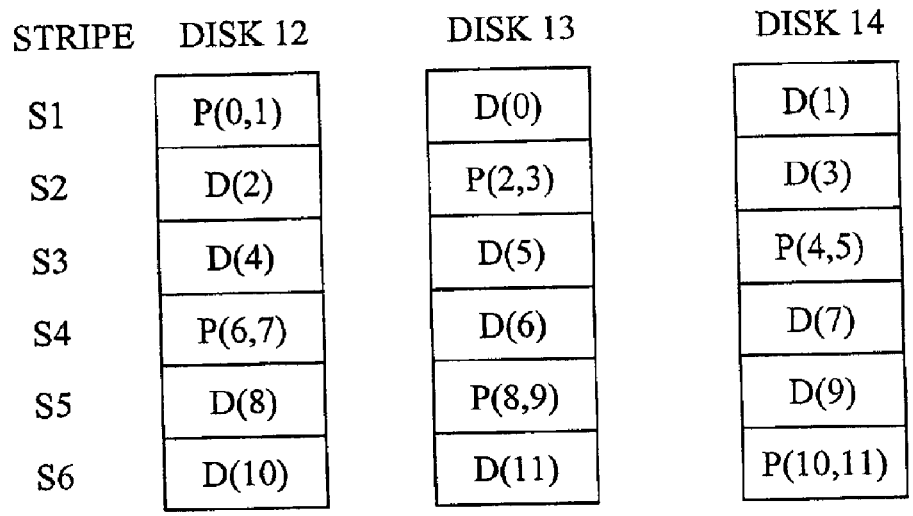
FIG. 4 depicts an example of storage of the data fragment of FIG. 3 in the RAID configuration of FIG. 1.

A first processor, e.g., processor 20 receives consecutive groups of pairs of data blocks and generates a parity block to associate with each pair of data blocks. The first processor 20 sends one block from each associated group of three blocks to each of RAID configurations 12, 12', 12". Each processor 20, 20', 20" of the respective RAID configuration 12, 12', 12" subsequently breaks each block into two miniblocks and generates a parity mini-block to associate with the two miniblocks. Each second level RAID configuration 12, 12', 12" stores the mini-blocks as illustrated in FIGS. 3 and 4 on respective disk drives 14a–14c, 14a'–14c" and 14a"–14c". The first processor 20 can also retrieve blocks from the RAID configurations 12, 12', 12" and deliver the retrieved blocks over an interface to a receiving device 19.

Still referring to FIG. 2, the clustered system 10 handles slowly responding or missing or degraded devices by reconstructing and transmitting reconstructed blocks. A reconstructor 22, 22', 22" respectively reconstructs and transmits to a receiving device 19, the reconstructed block for any one of the degraded RAID configurations 12, 12', 12". More specifically, the reconstructor, e.g. reconstructor 22 for processor 20, reconstructs and transmits data for a degraded or slowly responding disk drive in one of the degraded RAID configurations 12, 12', 12". A degraded RAID configuration 12, 12', 12" is signaled by a hint sent to a requesting processor, e.g., the first processor 20 of this example, from a degraded RAID configuration 12, 12', 12". The first processor 20 and reconstructor 22 handles latencies due to degraded disk responses. The first processor 20 provides predictability into the read latencies of the RAID configuration 10. The receiving device 19 can be embedded in each configuration 12 or can be an external device, e.g., a set top box for a video on demand application.

The cluster 10 uses a RAID process to build a fault tolerant clustered system of single processors. Data objects are stored as named fragment files across the members of the cluster. Data objects are striped in accordance with RAID-5 process (or other process, e.g., RAID-4) and stored with parity information to allow a missing named fragment file to be reconstructed if a cluster member (node) 11 fails.

Referring to FIG. 3, a fragment 50 of a data stream from the system 10 is shown. The fragment 50 will be stored in the RAID configurations 12–12" of FIG. 1. The processor 20 divides the fragment 50 into an ordered sequence of blocks D(0), D(1), . . . D(i) and determines a parity block P(i, i+1) (i=0, 2, 4, . . . ) to associate with consecutive pairs 52, 54 of the data blocks D(i), D(i+1). The parity block P(i, i+1) encodes at least one parity bit for each pair of equivalent bits of the associated pair 52, 54 of data blocks D(i), D(i+1). The processor 15 may write each associated pair 52, 54 of data blocks D(i), D(i+1) and parity block P(i, i+1) to the three the RAID configurations 12–12" in parallel or serially as explained in FIG. 1.

Referring to FIG. 4 the processor 20 writes data and parity blocks to storage locations on the three disks 14a–14c, 14a'–14c' and 14a"–14c" in the RAID configurations 12–12", as shown. The data are arranged in stripes S1–S6. Each stripe S1–S6 stores a group of three associated blocks, which includes a consecutive pair of data blocks D(i), D(i+1) and the parity block P(i, i+1) constructed from the pair. In some RAID implementations, the portion of each configuration 12–12" in a particular stripe S1–S6 stores either one of the data blocks D(i), D(i+1) or the associated parity block P(i, i+1). The processor 20 writes the parity blocks P(i, i+1) associated with sequential pairs to different ones of the configurations 12–12" by cyclically shifting the storage location of P(i, i+1) in each consecutive stripe. This is referred to as rotating the parity blocks P(i, i+1) across the configurations 12–12". Rotating the storage location of the parity block more uniformly distributes the data blocks D(j) among the configurations 12–12" spreading access burdens more uniformly across the different configurations 12–12" during data reads and writes.

The configuration shown in FIGS. 1 and 4 is often referred to as a RAID-5 configuration. Other configurations could be used such as RAID-4 and so forth. For example, in RAID-4 parity is stored on a dedicated parity drive of the RAID array, rather than dispersed among drives of the array, as in RAID-5. Clearly, other redundancy methods can be used including various forms of, for example, Huffman coding and other redundant coding techniques so that not only may one failure be taken into account but multiple failures can be taken into account. There may be an associated cost in increased processing in writing and reading of data.

Referring to FIG. 5, the reconstructor 22 includes a memory device 62 and a hardware processor 64. Both the memory device 62 and the processor 64 are coupled to a bus (not shown) that is part of processor 20. In some embodiments, the processor 64 can be the same processor as 20, 20' or 20" or can be a different processor, e.g., a coprocessor. The memory device 62 among other things receives data and/or parity blocks from the configurations 12–12" via the bus 16. The memory device 62 stores the associated data and parity blocks for reconstructing the associated block of a slowly responding configuration 12–12".

The processor 64 performs an exclusive OR (XOR) of the associated parity and data blocks to reconstruct the data block of the stalled one of configurations 12–12". To perform the XOR, the processor 64 reads the associated blocks from the memory device 62. The processor 64 XOR's corresponding bits of the read associated parity and data blocks in a byte-by-byte manner. The processor 64 writes the results of the XOR back to the memory device 62 for transmission to the appropriate one of the receiving devices 39–39". The reconstructor 22 can produce a reconstructed block for any one of the configurations 12–12".

Referring now to FIG. 6, software components 70 of the processors systems 20, 20' and 20" are shown. The software components 70 include a port driver 71 and a class driver 72. In addition, the software includes file system including a remote file provider 74, a local file provider 76, and a file system 78 (SeaFile, FAT, NTFS). The software includes a SCSI driver 80 and a RAID controller 82, as well as a fast Ethernet adapter 84 and a SeaNet transport layer 86.

In order to provide transparent data object access, a RAID port driver masks that the data object exist as a set of named fragment files. The port driver provides multiplexing and demultiplexing services to merge named fragment files into a data stream. The RAID port driver registers as both a provider and a consumer. When the class driver attempts to open a data object, it calls all of the provider port drivers in the system. Upon being called, the RAID port driver becomes a consumer and uses the class driver to open each of the data fragments that comprise the data object. Once a session has been established to each of the named fragment files, that is, once access has been provided to each named fragment file, the RAID port driver performs an open call back to notify the class driver that the data object is available.

In the particular application of accessing the data (e.g., video) objects, the port driver accesses the data (video) objects stored on the cluster. The remote file provider represents any third party application or device driver that might use the cluster technology. The on-disk structure of the cluster volume (file system 54) can be either NTFS, FAT, SeaFile or raw disk access. The file system component is responsible for storing and retrieving the named fragment files.

Figure 7:
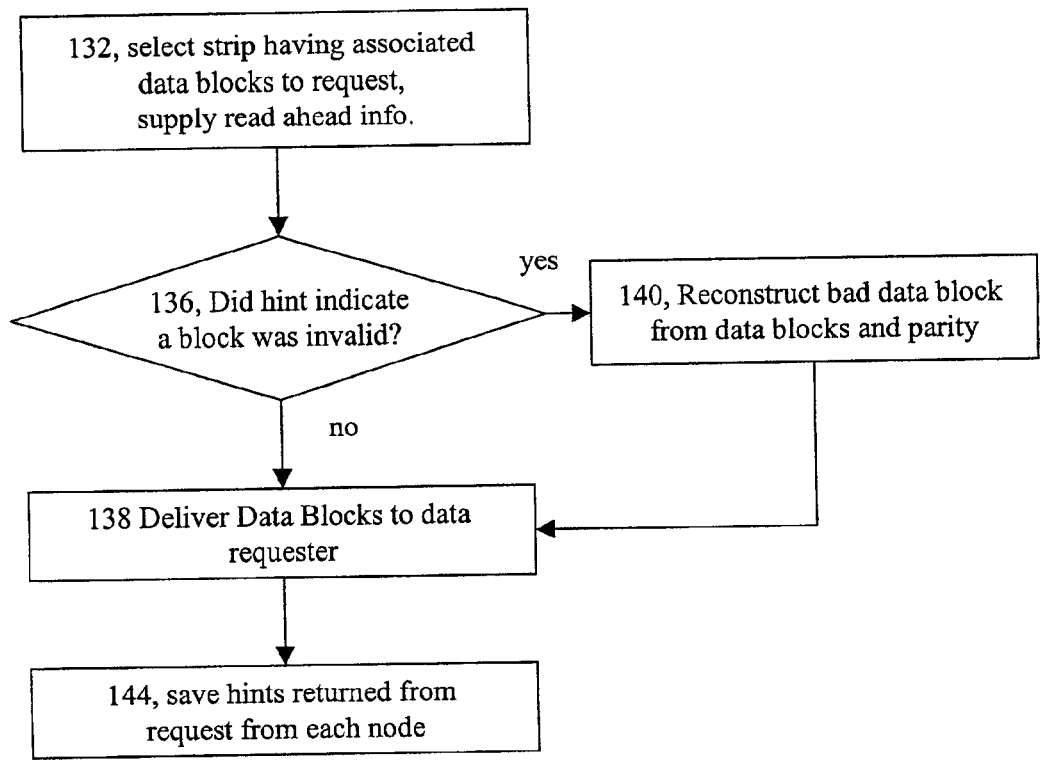
FIG. 7 is a flow chart depicting a process for reading data from the RAID configuration of FIG. 1.

Referring to FIG. 7, a process 100 to read data from the cluster 10 is shown. The processor 20 selects 102 the strip having the associated data blocks to transmit and supplies readahead information. The processor 15 determines 106 whether a hint from a previous access had indicated that any of the disks 31–33 were faulty. If not, the processor 20 delivers 108 the requested data blocks. If the hint indicated that a drive 31–33 was faulty, the reconstructor 22 requests data block of the not faulty one of drives 31–33 and parity to reconstruct the data block of the faulty disk drive 31–33 without bothering to access the faulty drive. The reconstructor 22 receives the associated data and parity blocks from storage locations of the same stripe S1 of the other disks 31–33, which are not slowly responding or degraded. The reconstructor 22 reconstructs the data and sends 112 the reconstructed data block to the data requester 19. The processor 20 saves 114 hints returned from each node or RAID configuration 12–12" for future requests.

The processor 20 (FIG. 1) processes the request and at the same time supplies a read ahead message to the file system, so that the file system can read the next block and have it in a cache (not shown). The read ahead message indicates that the next time, the requester will read the offset +64 Kbytes, for example. Depending on the configuration, sometimes a 64 KByte (KB) block of data is skipped, e.g., for a RAID-5 implementation to skip parity data. On the other hand, in a RAID-4 implementation it is not necessary to skip blocks, since parity is on a separate drive and a request is made to the parity drive.

The read-ahead message is used to show where the parity is. When the previous I/O transaction has completed, the file system on the processor 20 has communicated with the RAID controller (not shown) and has determined if the next block would be valid (e.g., available from the RAID controller, will respond in time, and so forth) or not. The file system on the processor 20 indicates via, the hint message, if the next block will be valid or invalid. If invalid, the file system returns the hint to the requesting processor 20, 20' 20" indicating that the next block will be a delayed read or will not be available, etc. This will enable the requesting one of configurations 12–12" to initiate a read around the bad block, i.e., to forgo a subsequent read request to the bad drive and rather to request parity and data from good drives.

The hint message can indicate a "next bad byte offset." The next bad byte offset indicates where the bad block is located based on some offset. The requesting system receives the "next bad byte offset" and can determine that the RAID array has a bad or reconstructing drive. The requesting system will skip the drive and instead read the parity and data block from the other drives. The reconstructor 22 performs an XOR operation on parity and data to reconstruct the missing data corresponding to the bad or reconstructing drive. Thus, by skipping the bad drive and not waiting for a slow drive to respond before trying to reconstruct data, will improve the performance of the RAID array towards normal performance.

Returning of the hint instructs the requesting system to start the recovery process or requesting process without waiting for degradation of performance to occur. The processor 20 through the file system has intimate knowledge of the block mapping and file structure on the RAID configuration 11 and the disk drives 14a–14c. Thus, the processor 20 can examine the request address and a stored block map (not shown) that indicates where the blocks are stored on the disk drives 31–33. From that information the file system constructs the hint to send to a device that will request the bad block to indicate the state of the RAID array. The hint masks various failures of the RAID array.

Nodes 11, 11' and 11" in the cluster 10 are peer-to-peer, consuming and providing data to the clustered system 10. The hint improves the performance of an impaired disk subsystem. When a drive is dead or rebuilding in a RAID array, the processor 20 needs to read the entire stripe row to reconstruct the data missing on the failed drive. When a large number of reader threads is placed on a degraded RAID array, the reconstruction cache is purged as new requests are serviced. Because the RAID array has a fixed size reconstruction cache, some/all data blocks may need to be read twice because they are flushed before they are used to reconstruct the bad block. The performance of the RAID controller will degrade to ½ or more of the non-degraded performance in this case. By using the hint message to avoid the failed drive, the impaired RAID array can run at $^{11}/_{12}$ th efficiency (assuming a 12 drive array). The input/output requests from the failed drive are handled by the other systems in the cluster in the form of parity data requests ($^{1}/_{12}$ th of the load on the RAID array).

The process 100 reconstructs the block from parity and data as discussed above. With the hint indicating a bad read, the read ahead is turned off, because performing such a read operation will degrade system 10 performance. The read ahead cache (not shown) is disabled at the point that the file system returns the hint to the requesting system indicating the next request at the byte offset will land on a bad drive.

In other embodiments the file system 74 can look further ahead and produce a hint to the remote system 19 where the next request to the bad drive is going to land, so that the requesting system 11 can read up to that point and skip over the bad drive. The local file system 74 on the processor 20 manages the file fragment at the remote end and knows that the next block in the file is either bad or good. The file system 74 returns the hint to the requesting system 11. The requesting system 19 determines whether to read the block from the drive or initiate a recovery mode and read the parity block and data from other drives and Exclusive-Or the data with parity to recover the lost block.

In a case where the file system 74 encounters the same situation with two systems, the file system 74 can implement a tie-breaking algorithm, e.g., a round robin algorithm where the system 10 first reads one node and the next time reads from the other node.

Referring back to FIGS. 1–3, the processor 20 controls reconstruction and transmission of reconstructed data blocks. The processor 20 orders the remaining nodes 12–12" to transmit the associated blocks to the reconstructor 22, e.g., to the memory device 62, if the received hint indicates a problem. In FIG. 4, the associated data and parity blocks are stored in the same stripe S1–S6 as the untransmitted data block from the defective or slowly responding disk 14a–14c. Thus, the processor 20 orders reads of the associated stripe S1–S6 to obtain the associated blocks. The processor 20 signals the reconstructor 22 to reconstruct the data block from a slowly responding disk, e.g., by a signal sent to the processor 64 of FIG. 3. Then, the processor 20 reads the reconstructed block from the reconstructor 22, e.g., the memory device 62, and transmits the reconstructed block via the interface or line 17. The processor 20 does not interrupt a slowly responding disk 14a–14c from recovering by sending a request to transmit data. Instead, the processor 20 orders the reconstructor 22 to reconstruct the missing data from the associated data blocks in the normally responding nodes 12–12".

Figure 8:
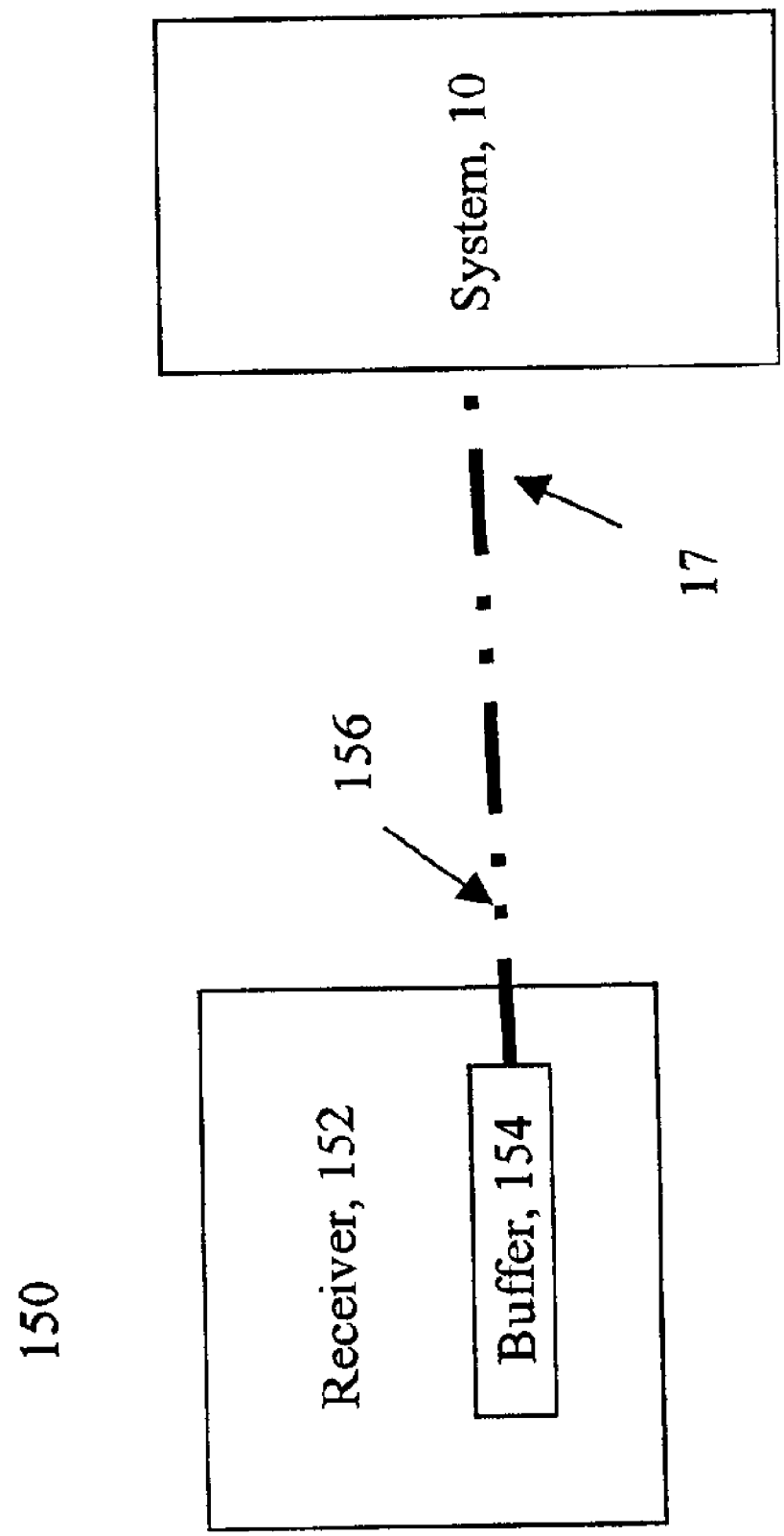
FIG. 8 is a block diagram of a video system using the RAID configuration of FIG. 1.

Referring to FIG. 8, a video transmission system 150, which uses the system 10 of FIG. 1 is shown. A receiver 152 receives data blocks transmitted from the interface via line 17 at an input terminal 156. Transmission between the system 10 and receiver 152 may be by radio wave, light, and/or cable transmission. The input terminal 156 couples to an input data buffer 154, e.g., a first-in-first-out buffer. The input data buffer 154 stores two to several times the quantity of data included in one data block shown in FIG. 2B. Data stored in the input data buffer 154 provides for continuous video data processing in the event of a short transmission interruption.

The video transmission system 150 can lower the occurrence of viewing pauses by transmitting a reconstructed data block in response to receiving the hint. In one embodiment of the system 150, the RAID configuration 11 in system 10 needs about 100 ms to transmit and reconstruct a data block. The receiver's input data buffer 117 stores about 2000 ms of video data. This storage provides sufficient stored data to deliver normal video while giving sufficient time to reconstruct lost data in response to receiving the hint.

Other embodiments are within the scope of the appended claims.

What is claimed is:

1. A method for reading data from a clustered system of a plurality of redundant array of inexpensive disks (RAID) device configurations, the method comprises:
   receiving a message from a requesting one of members of the clustered system that indicates a next location for a particular block for a subsequent read operation from a drive in the RAID device configurations; and
   returning to the requesting one of members of the clustered system a hint that indicates the state of the drive in the RAID device configurations corresponding to the next location for the subsequent read operation;
   wherein returning the hint instructs the requesting member to start a recovery process or requesting process without waiting for degradation of performance to occur.

2. The method of claim 1 wherein the hint indicates that performance of the device is degraded or the drive is unavailable.

3. The method of claim 1 wherein the system returns a next bad byte offset message to the requesting member.

4. The method of claim 1 wherein the requesting member will skip the drive and instead read redundant information and at least one data block from one of the other drives in the RAID device configurations.

5. The method of claim 1 wherein the requesting member will skip the drive and reconstruct data from the skipped drive from redundant information from one of the other drives in the RAID device configurations.

6. The method of claim 5 further comprising:
   performing an XOR operation on parity and data to reconstruct missing data corresponding to data on the skipped drive.

7. The method of claim 1 further comprising:
   requesting a first drive of the RAID device configurations to transmit a first data block stored therein to a receiving device;
   reconstructing the first data block from associated data stored in other drives of the RAID device configurations; and transmitting the reconstructed first data block directly to the receiving device.

8. The method of claim 7 wherein the reconstructing and the transmitting are performed in response to receiving the hint indicating that performance of the drive is degraded or the drive is unavailable.

9. The method of claim 1 wherein a disk controller returns a next bad byte offset, and the requesting member receives the next byte offset and determines that the RAID device configurations has a bad or reconstructing drive.

10. A clustered system of plurality of redundant array of inexpensive disks (RAID) device configurations to transmit data blocks to a receiving device, comprising:
a plurality of cluster members coupled so that any one cluster member can deliver data to at least some of remaining cluster members, each cluster member comprising:
a plurality of disks adapted to store the blocks and to transmit the stored blocks to the receiving device;
a processor to control reads from and writes to the plurality of disks; and
a process to receive a message that indicates a next location for a particular block for a subsequent read operation from a drive in the RAID device configurations and produce a hint that indicates the state of the drive in the RAID device configurations corresponding to the next location for the subsequent read operation;
wherein a disk controller returns a next bad byte offset, and the requesting system receives the next bad byte offset and determines that the RAID device configuration has a bad or reconstructing drive.

11. The system of claim 10 further comprising:
a device to reconstruct a particular block from associated blocks and to transmit the reconstructed block to the receiving device in response to the hint that indicated the state of the drive in the RAID device configurations.

12. The system of claim 10 wherein the processor starts a recovery process based on a state of the hint.

13. A clustered configuration comprises:
a plurality of clustered nodes each node comprising a redundant array of inexpensive disks (RAID) and a processor adapted to write blocks to and read blocks from the redundant array of inexpensive disks;
a process to receive a message that indicates a next location for a particular block for a subsequent read operation from a drive in the redundant array of inexpensive disks of one of the nodes and produce a hint that indicates the state of the drive in the redundant array of inexpensive disks corresponding to the next location for the subsequent read operation; and
a device to reconstruct a particular block from associated blocks and parity information and to transmit the reconstructed block to a receiving device in response to the hint that indicates the state of the drive in the redundant array of inexpensive disks.

14. The configuration of claim 13 wherein the hint indicates that performance of the drive is degraded or the drive is unavailable.

15. A method for reading data from a clustered system including a redundant array of disks, the method comprising:
receiving a first message at a member of the clustered system from a requestor, the first message indicating next desired data to be requested in a subsequent read request from the requestor;
returning to the requestor a hint characterizing an ability of the redundant array of disks to respond to the subsequent read request; and
in response to receiving a hint, requesting redundant information for reconstructing the desired data.

16. The method of claim 15, wherein receiving the first message from the requestor comprises receiving the first message from a device external to the clustered system.

17. The method of claim 15, wherein receiving the first message from the requestor comprises receiving the first message from a member of the clustered system.

18. The method of claim 15, wherein the first message includes a read request.

19. The method of claim 15, wherein the hint indicates that performance of a drive in the redundant array of disks is degraded or a drive in the redundant array of disks is unavailable.

20. The method of claim 15, further comprising:
performing an XOR operation on parity and data to reconstruct the desired data.

21. A method for reading data from a clustered system including a redundant array of disks, the method comprising:
receiving a first message at a member of the clustered system from a requestor, the first message indicating next desired data to be requested in a subsequent read request from the requestor; and
returning to the requestor a hint characterizing an ability of the redundant array of disks to respond to the subsequent read request:
wherein the hint includes a next bad byte offset.

22. A method for reading data from a clustered system including a redundant array of disks, the method comprising:
receiving a first message at a member of the clustered system from a requestor, the first message indicating next desired data to be requested in a subsequent read request from the requestor; and
returning to the requestor a hint characterizing an ability of the redundant array of disks to respond to the subsequent read request;
wherein the hint instructs the requestor to start a recovery process or requesting process without waiting for degradation of performance to occur.

23. A clustered system comprising:
a plurality of cluster members coupled so that any one cluster member can deliver data to at least some of remaining cluster members, each cluster member comprising:
a redundant array of disks adapted to transmit stored data to a requestor; and
a processor configured to
receive a first message at a member of the clustered system from a requestor, the first message indicating next desired data to be requested in a subsequent read request from the requestor, and
return to the requestor a hint characterizing an ability of the redundant array of disks to respond to the subsequent read request;
wherein the requestor is configured to, in response to receiving a hint, request redundant information for reconstructing the desired data.

24. The system of claim 23, wherein receiving the first message from the requestor comprises receiving the first message from a device external to the clustered system.

25. The system of claim 23, wherein receiving the first message from the requestor comprises receiving the first message from a member of the clustered system.

26. The system of claim 23, wherein the first message includes a read request.

27. The system of claim 23, wherein the hint indicates that performance of a drive in the redundant array of disks is degraded or a drive in the redundant array of disks is unavailable.

28. A clustered system comprising:

a plurality of cluster members coupled so that any one cluster member can deliver data to at least some of remaining cluster members, each cluster member comprising:

a redundant array of disks adapted to transmit stored data to a requestor; and a processor configured to receive a first message at a member of the clustered system from a requestor, the first message indicating next desired data to be requested in a subsequent read request from the requestor, and return to the requestor a hint characterizing an ability of the redundant array of disks to respond to the subsequent read request;

wherein the hint includes a next bad byte offset.

29. A clustered system comprising:

a plurality of cluster members coupled so that any one cluster member can deliver data to at least some of remaining cluster members, each cluster member comprising:

a redundant array of disks adapted to transmit stored data to a requestor; and a processor configured to receive a first message at a member of the clustered system from a requestor, the first message indicating next desired data to be requested in a subsequent read request from the requestor; and return to the requestor a hint characterizing an ability of the redundant array of disks to respond to the subsequent read request;

wherein the hint instructs the requestor to start a recovery process or requesting process without waiting for degradation of performance to occur.

30. The system of claim 23, wherein the requestor is further configured to perform an XOR operation on parity and data to reconstruct the desired data.

* * * * *

UNITED STATES PATENT AND TRADEMARK OFFICE
CERTIFICATE OF CORRECTION

PATENT NO. : 6,950,966 B2
DATED : September 27, 2005
INVENTOR(S) : Kenneth F. Chiquoine et al.

It is certified that error appears in the above-identified patent and that said Letters Patent is hereby corrected as shown below:

Title page,
Item [54], Title, replace "SERVICES" with -- DEVICES --.

Signed and Sealed this

Seventh Day of March, 2006

JON W. DUDAS
*Director of the United States Patent and Trademark Office*